(12) United States Patent
Liao et al.

(10) Patent No.: US 8,251,532 B2
(45) Date of Patent: Aug. 28, 2012

(54) BACK LIGHT MODULE AND FLAT DISPLAY DEVICE USING THE SAME

(75) Inventors: Yuan-Hsu Liao, Tainan County (TW); Wei-Sen Chen, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 249 days.

(21) Appl. No.: 12/715,642

(22) Filed: Mar. 2, 2010

(65) Prior Publication Data

US 2010/0226119 A1 Sep. 9, 2010

(30) Foreign Application Priority Data

Mar. 3, 2009 (TW) ................................ 98106893 A

(51) Int. Cl.
*G09F 13/04* (2006.01)
*G09F 13/08* (2006.01)

(52) U.S. Cl. ............. 362/97.2; 362/217.03; 362/249.02; 362/342

(58) Field of Classification Search ........ 362/97.1–97.4, 362/217.03, 249.02, 342, 800; 349/66
See application file for complete search history.

(56) References Cited

U.S. PATENT DOCUMENTS

2006/0221612 A1* 10/2006 Song et al. ..................... 362/247
2007/0189009 A1* 8/2007 Ho ................................. 362/241
2009/0128741 A1* 5/2009 Peng et al. ...................... 349/67
* cited by examiner

*Primary Examiner* — Jason Moon Han

(57) ABSTRACT

A back light module and a flat display device using the same are provided. The back light module includes a reflector, at least two light sources and at least one partition. The light sources are disposed above the reflector. The partition is disposed at a substantially central location between the two light sources and is substantially perpendicular to a line connecting the two light sources. The partition is a plate having a uniform thickness, and surfaces of the partition that face the two light sources are reflective.

16 Claims, 4 Drawing Sheets

US 8,251,532 B2

BACK LIGHT MODULE AND FLAT DISPLAY DEVICE USING THE SAME

This application claims the benefit of Taiwan application Serial No. 98106893, filed Mar. 3, 2009, which is incorporated herein by reference in its entirety.

BACKGROUND

1. Technical Field

The disclosure relates in general to a back light module and a flat panel display device using the same, and more particularly, to a back light module including at least two light sources, and a flat display device using the same.

2. Description of the Related Art

As flat display devices have advantages such as light weight, thin thickness, small size, and low power consumption, they have become increasingly popular and are widely applied to various electronic devices.

With the recent progress of the flat display device technology, the requirements for the display quality of the flat display devices are also increased. Various poor display phenomena, such as retained images of motion pictures or the ripple phenomenon (Mura), have to be overcome in the present flat panel display technology.

SUMMARY

According to a first aspect of the present invention, a back light module is provided. The back light module includes a reflector, at least two light sources and at least one partition. The light sources are disposed above the reflector. The partition is disposed at a substantially central location between the two light sources, and is substantially perpendicular to a line connecting the two light sources. The partition is a plate having a uniform thickness, and surfaces of the partition that face the two light sources are reflective.

According to a second aspect of the present invention, a flat display device is provided. The flat display device includes a display panel and a back light module. The back light module is disposed at one side of the display panel. The back light module includes a reflector, at least two light sources and at least one partition. The light sources are disposed above the reflector. The partition is disposed at a substantially central location between the two light sources. The two light sources are positioned substantially symmetrically across the partition. The partition is a plate having a uniform thickness, and surfaces of the partition that face the two light sources are reflective.

DETAILED DESCRIPTION

First Embodiment

Figure 1:
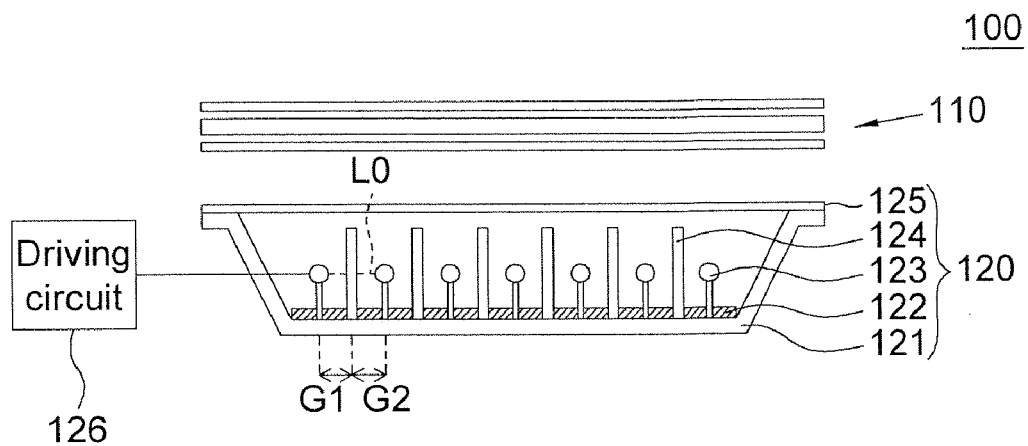
FIG. 1 is a schematic illustration showing a flat display device according to a first embodiment of the present invention.

Referring to FIG. 1, a schematic illustration showing a flat display device 100 according to a first embodiment of the present invention is shown. The flat display device 100 includes a display panel 110 and a back light module 120. The display panel 110 is, for example, a liquid crystal display panel. The back light module 120 disposed at one side of the display panel 110 is used for providing light rays. The light rays form images after transmitting through the display panel 110. The back light module 120 includes a back plate 121, a reflector 122, at least two light sources 123, a partition 124, at least one optical film 125 and a driving circuit 126. The back plate 121 is used for supporting the reflector 122 and the light sources 123. The reflector 122 is disposed above a top surface of the back plate 121. A surface of the reflector 122 is reflective for reflecting the light rays generated by the light sources 123.

Each of the light sources 123 includes at least one light emitting unit, such as a cold cathode fluorescent lamp (CCFL), a light emitting diode (LED) or an external electrode fluorescent lamp (EEFL). In the embodiment, the light emitting unit of each light source 123 is a CCFL, and each light source 123 only contains one light emitting unit.

The partition 124 is located at a substantially central location between the two light sources 123 and is substantially perpendicular to a line L0 connecting the two light sources 123. When the light sources 123 are arranged at substantially the same height relative to the top surface of the back plate 121, the partition 124 is substantially perpendicular to the top surface of the back plate 121. As shown in FIG. 1, the gaps G1 and G2 between the partition 124 and the two light sources 123 on two sides are substantially equal to each other. In other words, the light sources 123 are positioned substantially symmetrically across the partition 124. The partition 124 is a plate having a uniform thickness, and the surfaces of the partition 124 facing the two light sources 123 are reflective for reflecting the light rays generated by the light sources 123.

The optical film 125 is disposed above the back plate 121, the reflector 122, the light sources 123 and the partition 124, and is substantially parallel to the top surface of the back plate 121. The optical film 125 is, for example, a diffuser, a brightness enhancement film or a polarizer.

The driving circuit 126 is electrically connected to each light source 123 so as to drive and control the power or brightness of the light sources 123. For the sake of simplicity, the driving circuit 126 in FIG. 1 is shown to be only connected to one of the light sources 123. The driving circuit 126 is, for example, a circuit board composed of one or more integrated circuit chips.

In one or more embodiment of the present invention, in order to enhance the motion picture quality, the driving circuit 126 may turn on the light sources 123 by zones or sequentially turn on the light sources 123 by way of scanning. As shown in FIG. 1, the partition 124 disposed between the light sources 123 effectively blocks the light rays generated by an adjacent light source 123 from leaking to other light sources 123. Consequently, the motion picture quality can be effectively enhanced.

Figure 2A:
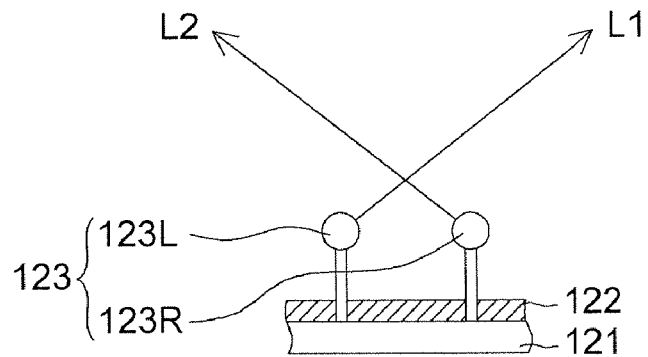
FIG. 2A is a schematic illustration showing light rays generated by two adjacent light sources in the absence of a partition between the light sources.
Figure 2B:
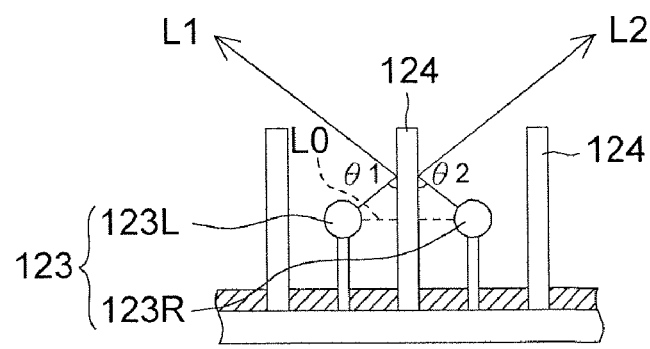
FIG. 2B is a schematic illustration showing the light rays generated by two adjacent light sources when a partition in accordance with one or more embodiments is provided.

Referring to FIGS. 2A and 2B, a schematic illustration showing light rays generated by two adjacent light sources 123 in the absence of the partition 124 is shown in FIG. 2A, and a schematic illustration showing the light rays generated by two adjacent light sources 123 when the partition 124 in accordance with one or more embodiments is provided is shown in FIG. 2B. As shown in FIG. 2A, without a partition, the light sources 123 emit light rays in several radial paths. For example, a first light ray L1 of a left light source 123L travels to the location above a right light source 123R, and a second light ray L2 of the right light source 123R travels to the location above the left light source 123L.

As shown in FIG. 2B, when the partition 124 is provided, the radial paths of the light sources 123 are blocked by the partition 124 and thus changed. As the surfaces of the partition 124 are reflective, the light rays of each light source 123 are incident onto the partition 124 and then reflected in other directions. For example, the first light ray L1 of the left light source 123L is incident rightward onto the partition 124 and then reflected leftward back to the location above the left light source 123L; and the second light ray L2 of the right light source 123R is incident leftward onto the partition 124, and then reflected rightward back to the location above the right light source 123R.

In addition, as the partition 124 is a plate having a uniform thickness and is substantially perpendicular to the line L0 connecting the left light source 123L and the right light source 123R, two side surfaces of the partition 124 are substantially perpendicular to the line L0. Consequently, the reflected light paths just overlap with the light paths formed when no partition is provided. For example, when the first light ray L1 and the second light ray L2 are respectively incident onto the positions of the partition 124 which are opposite to each other, the first included angle θ1 between the first light ray L1 and the partition 124 is just equal to the second included angle θ2 between the second light ray L2 and the partition 124, such that the path of the first light ray L1 reflected leftward back to the left side just overlaps with the path of the second light ray L2 to be originally emitted to the left side, and the path of the second light ray L2 reflected rightward back to the right side just overlaps with the path of the first light ray L1 to be originally emitted to the right side. Consequently, when the light sources 123 are turned on by zones or sequentially turned on by way of scanning, the partition of the light rays may be effectively achieved through the disposition of the partition 124 with reflective surfaces. Meanwhile, as shown in the drawings, the path of the light rays reflected by the partition 124 may be the same as that generated when no partition 124 is provided. Thus, the ripple (Mura) phenomenon which is caused by non-uniformly reflected light rays may be effectively avoided.

The inventor(s) have discovered that the effect that the path of the reflected light ray overlaps with that generated without the partition 124 can be better obtained when the thickness of the partition 124 is smaller than 0.3 millimeters (mm).

Figure 3:
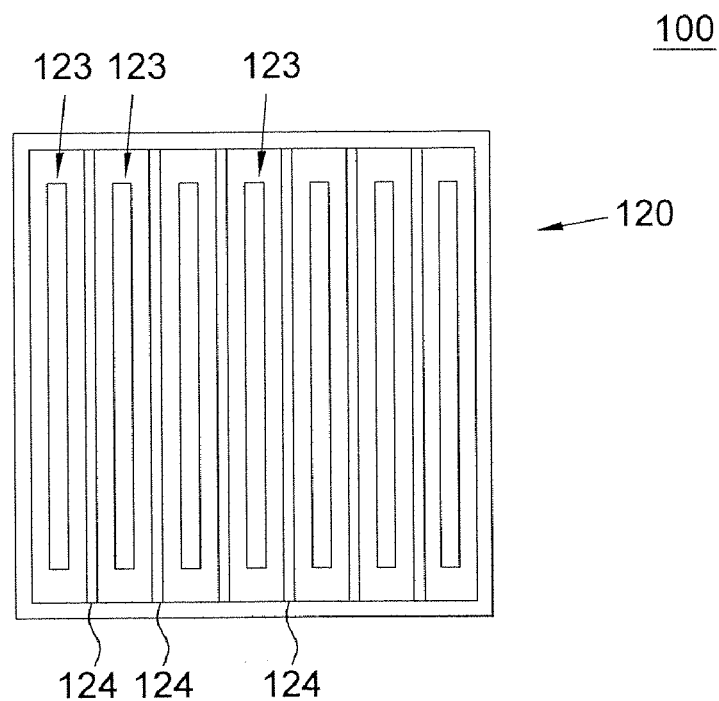
FIG. 3 is a top view of the flat display device in FIG. 1.

Referring to FIG. 3, a top view of the flat display device 100 in FIG. 1 is shown. In this embodiment, the back light module 120 includes several partitions 124 and several light sources 123. These partitions 124 are parallel to one another, and the partitions 124 and the light sources 123 are alternately disposed. Each partition 124 is disposed at a substantially central location between two adjacent light sources 123. When the distances between the light sources 123 are the same, the distances between the partitions 124 are also the same. When the distances between the light sources 123 are different, the distances between the partitions 124 may be different. In the embodiment in FIG. 3, the distances between the light sources 123 are the same, and the distances between the partitions 124 are also the same.

Figure 4:
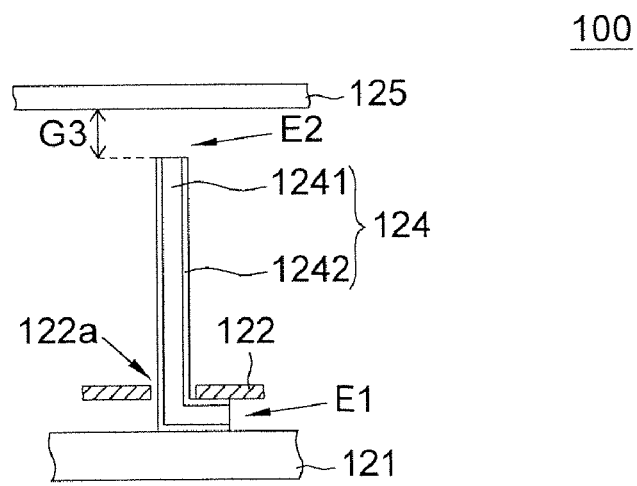
FIG. 4 is a schematically enlarged view of a partition structure in accordance with one or more embodiments.

Referring to FIG. 4, a schematically enlarged view of a partition structure comprising the partition 124, the back plate 121 and the reflector 122 is shown. The partition 124 includes a body 1241 having opposite two surfaces and a mirror film 1242 covering each of the surfaces of the body 1241 to define the reflective surfaces of the partition 124. The material of the body 1241 includes stainless steel or tinplate, and the material of the minor film 1242 includes silver. Alternatively, the partition 124 may also be a piece of two-sided glass composed of a glass (or transparent) layer, as the body 1241, and a silver layer, as the minor film 1242, on only one side or on both sides of the glass layer.

Referring again to FIG. 4, the reflector 122 of this embodiment has at least one opening 122a. The first (or lower) end E1 of the partition 124 passes through the opening 122a and is connected to the top surface of the back plate 121. The connection between the first end E1 of the partition 124 and the back plate 121 is made by way of adhering, welding or screwing, for example. In one embodiment, the first end E1 of the partition 124 is an L-shaped structure, so that the contact area between the partition 124 and the back plate 121 can be enlarged to enhance the connection strength.

Referring again to FIG. 4, the second (or upper) end E2 of the partition 124 of this embodiment is disposed adjacent to the optical film 125, and a gap G3 is formed between the optical film 125 and the second end E2 of the partition 124. Consequently, the optical property of the optical film 125 is not affected by the partition 124. The inventor(s) have discovered that the effect of blocking light leakage is deteriorated when the gap G3 is too large; and when the gap G3 is too small, the distance from the partition 124 to the optical film 125 is too short so as to affect the optical property of the optical film 125. The inventor(s) have discovered that, when the gap G3 is smaller than or equal to 5 millimeters, the optical property of the optical film 125 is not affected by the partition 124, while the effects of blocking light leakage and avoiding mura achieved by the partition 124 are maintained.

Second Embodiment

Figure 5:
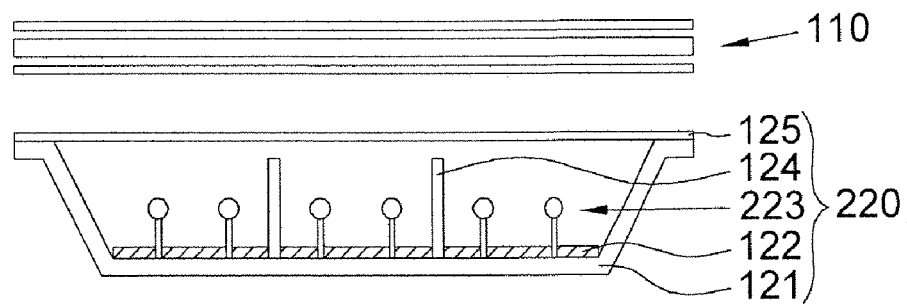
FIG. 5 is a schematic illustration showing a flat display device according to a second embodiment of the present invention.
Figure 6:
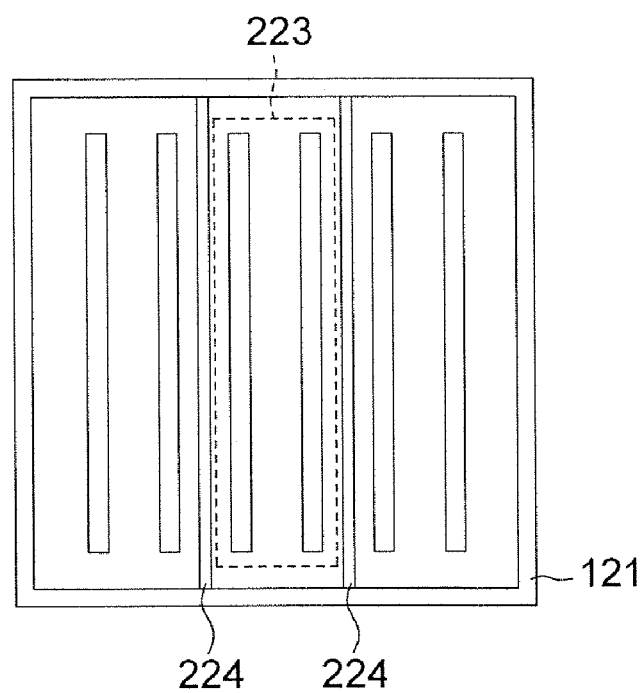
FIG. 6 is a top view of the flat display device in FIG. 5.

Referring to FIGS. 5 and 6, a schematic illustration showing a flat display device 200 according to a second embodiment of the present invention is shown in FIG. 5, and a top view of the flat display device 200 in FIG. 5 is shown in FIG. 6. The difference between the flat display device 200 of this embodiment and the flat display device 100 of the first embodiment is that each light source 223 of a back light module 220 of this embodiment includes several light emitting units. The other detailed descriptions which are the same as the first embodiment are not repeatedly described herein.

As shown in FIGS. 5 and 6, when the light source 223 includes several light emitting units, not every light emitting unit is located at a central location of a space formed between the adjacent partitions 124. However, the reflected light paths can still overlap with those generated when no partition 124 is provided when the partition 124 is located at the substantially central location between two adjacent light sources 223.

Third Embodiment

Figure 7:
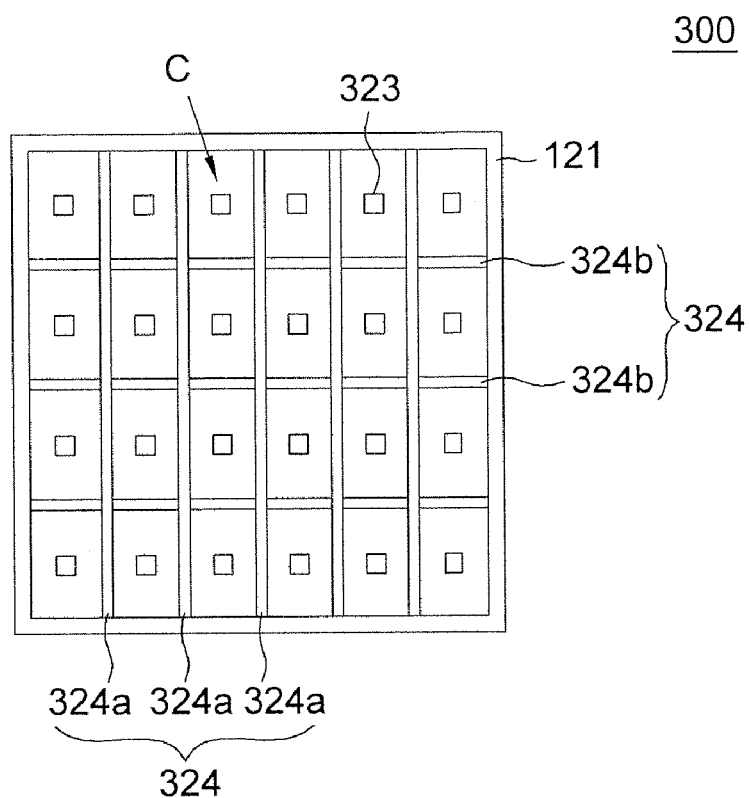
FIG. 7 is a top view of a flat display device according to a third embodiment of the present invention.

Referring to FIG. 7, a top view of a flat display device 300 according to a third embodiment of the present invention is shown. The differences between the flat display device 300 of this embodiment and the flat display device 100 of the first embodiment are the arrangement of the partitions 324 and the types of the light emitting units of the light sources 323. The other detailed descriptions which are the same as the first embodiment are not repeatedly described herein.

As shown in FIG. 7, a back light module of this embodiment includes several partitions 324 and several light sources 323. The type of the light emitting unit of the light source 323 of this embodiment is light emitting diode. Each light source 323 includes one or more light emitting diodes. The partitions 324 are divided into first partitions 324a and second partitions 324b. The first partitions 324a are perpendicular to the second partitions 324b. The first partitions 324a are parallel to one another, and the second partitions 324b are parallel to one another. Therefore, the first partitions 324a and the second partitions 324b form a matrix structure.

Every two adjacent first partitions 324a and every two adjacent second partitions 324b form a compartment C. One light source 323 is correspondingly disposed in one of the compartments C, and each partition 324 is located at a substantially central location between two adjacent light sources 323. Consequently, two first partitions 324a and two second partitions 324b around one light source 323 can achieve the effect of making the reflected light paths overlap with those generated when no partition 324 is provided.

Fourth Embodiment

Figure 8:
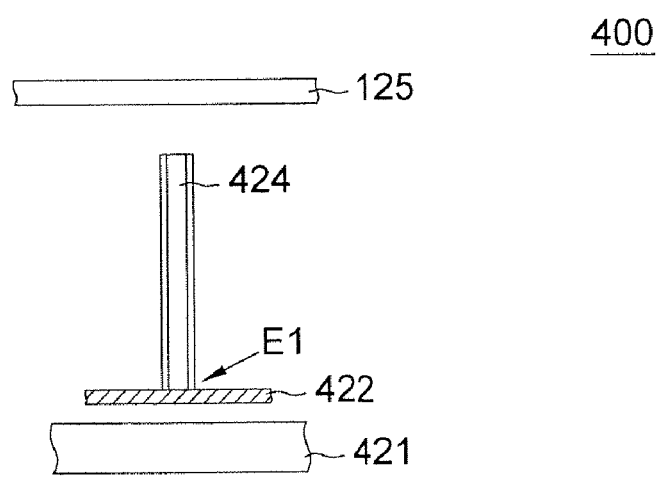
FIG. 8 is a schematically enlarged view of a partition structure according to a fourth embodiment of the present invention.

Referring to FIG. 8, a schematically enlarged view showing a partition structure comprising a partition 424, a back plate 421 and a reflector 422 of a flat display device 400 according to a fourth embodiment of the present invention is shown. The difference between the flat display device 400 of this embodiment and the flat display device 100 of the first embodiment is the arrangement relationship between the partition 424, the back plate 421 and the reflector 422. The other detailed descriptions which are the same as the first embodiment are not repeatedly described herein.

As shown in FIG. 8, the first end E1 of the partition 424 is connected to the surface of the reflector 422, so that the partition 424 is disposed on the reflector 422. The connection between the partition 424 and the reflector 422 is made by way of adhering, welding, mechanically engaging or screwing, for example. The partition structure in accordance with the fourth embodiment is also applicable to the other embodiments disclosed herein, especially the second and third embodiments.

The flat display device and the back light module thereof according to the embodiments of the present invention have many advantages according to various designs of the partitions. Some of the advantages will be described in the following section.

First, the partition disposed between the light sources can effectively block the light of one light source from leaking to other light sources. Consequently, the motion picture quality can be effectively enhanced when the light sources are turned on by zones or sequentially turned on by way of scanning.

Second, as the partition is a plate having a uniform thickness and is substantially perpendicular to a line connecting two adjacent light sources, the reflected light paths just overlap with the paths generated when no partition is provided. Thus, the ripple phenomenon (Mura) generated by non-uniformly reflected light rays from the partition can be effectively avoided.

Third, when the thickness of the partition is smaller than 0.3 millimeters (mm), the effect that the reflected light paths overlap with the paths generated when no partition is provided can be better obtained.

Fourth, in one or more embodiment, the first end of the partition is an L-shaped structure, so that the contact area between the partition and the back plate can be enlarged to enhance the connection strength.

Fifth, the second end of the partition is disposed adjacent to the optical film, and a gap is formed between the partition and the optical film. Consequently, the optical property of the optical film is not affected by the partition.

Sixth, when the gap is smaller than or equal to 5 millimeters, the optical property of the optical film is not affected by the partition, and the effects of blocking light leakage and avoiding mura achieved by the partition can be maintained.

Seventh, in one or more embodiments, when the light source includes several light emitting units, the partition can still make the reflected light paths overlap with those generated when no partition is provided.

Eighth, in one or more embodiment, the partitions arranged in the form of a matrix structure also make the reflected light paths overlap with the paths generated when no partition is provided.

Ninth, in one or more embodiment, when the partition is not directly disposed on the back plate, the reflected light paths can still overlap with the paths generated when no partition is provided.

While several exemplary embodiments of the invention have been described by way of examples, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A back light module, comprising:
a reflector;
at least two light sources disposed above the reflector, the two light sources including a first light source configured to emit a first light ray and a second light source configured to emit a second light ray;
at least one partition disposed at a substantially central location between the two light sources and substantially perpendicular to a line connecting the two light sources;
a back plate supporting the reflector and the light sources thereon, wherein the reflector includes at least one opening,
a lower end of the partition passes through the opening and is connected to a top surface of the back plate, and
the lower end of the partition has an L-shaped structure; and
an optical film disposed above the at least one partition, wherein
the partition is a plate having a uniform thickness of 0.3 millimeters at most and including a first surface configured to reflect the first light ray and a second surface configured to reflect the second light ray,
a first angle between the first light ray and the first surface is equal to a second angle between the second light ray and the second surface, and
an upper end of the partition is disposed adjacent to the optical film, forming a gap smaller than or equal to 5 millimeters therebetween.

2. The back light module according to claim 1, wherein a lower end of the partition is connected to a surface of the reflector so that the partition is disposed on the reflector.

3. The back light module according to claim 1, wherein
the optical film is disposed above the back plate and substantially parallel to a top surface of the back plate.

4. The back light module according to claim 1, wherein each of the light sources only contains one light emitting unit.

5. The back light module according to claim 4, wherein each light emitting unit is a cold cathode fluorescent lamp (CCFL), a light emitting diode (LED) or an external electrode fluorescent lamp (EEFL).

6. The back light module according to claim 1, wherein each of the light sources comprises a plurality of light emitting units.

7. The back light module according to claim 6, wherein each light emitting unit is a cold cathode fluorescent lamp (CCFL), a light emitting diode (LED) or an external electrode fluorescent lamp (EEFL).

8. The back light module according to claim 1, wherein the back light module comprises a plurality of partitions and a plurality of light sources, the partitions are parallel to one another, the partitions and the light sources are alternatingly disposed, and each of the partitions is disposed at a substantially central location between two adjacent light sources.

9. The back light module according to claim 1, wherein the back light module comprises a plurality of partitions and a plurality of light sources, the partitions comprise a plurality of first partitions and a plurality of second partitions, the first partitions are perpendicular to the second partitions, the first partitions are parallel to one another, and the second partitions are parallel to one another.

10. The back light module according to claim 9, wherein every two adjacent first partitions and every two adjacent second partitions form a compartment in which one of the light sources is correspondingly disposed, and each of the partitions is disposed at a substantially central location between two adjacent light sources.

11. The back light module according to claim 10, wherein each of the light sources comprises at least one light emitting diode.

12. The back light module according to claim 1, further comprising:
a driving circuit electrically connected to each of the light sources for driving the light sources.

13. The back light module according to claim 1, wherein the partition comprises:
a body including the first and second surfaces; and
a mirror film covering each of the first and second surfaces.

14. The back light module according to claim 13, wherein a material of the body comprises stainless steel or tinplate, and a material of the minor film comprises silver.

15. The back light module according to claim 1, wherein the partition comprises:
a transparent body having opposite two surfaces; and
a minor film covering at least one of the two surfaces of the body to define at least one of the surfaces of the partition.

16. A flat display device, comprising:
a display panel; and
a back light module disposed at one side of the display panel and comprising:
a reflector;
at least two light sources disposed above the reflector, the two light sources including a first light source configured to emit a first light ray and a second light source configured to emit a second light ray;
at least one partition disposed at a substantially central location between the two light sources;
a back plate supporting the reflector and the light sources thereon, wherein
the reflector includes at least one opening,
a lower end of the partition passes through the opening and is connected to a top surface of the back plate, and
the lower end of the partition has an L-shaped structure; and
an optical film disposed above the at least one partition, wherein
the two light sources are positioned substantially symmetrically across the partition,
the partition is a plate having a uniform thickness of 0.3 millimeters at most and including a first surface configured to reflect the first light ray and a second surface configured to reflect the second light ray,
a first angle between the first light ray and the first surface is equal to a second angle between the second light ray and the second surface, and
an upper end of the partition is disposed adjacent to the optical film, forming a gap smaller than or equal to 5 millimeters therebetween.

* * * * *